March 31, 1959  H. E. WHITE  2,880,021
TELESCOPIC PIPE JOINT WITH TOLERANCE ACCOMMODATING MEANS
Filed March 12, 1954  2 Sheets-Sheet 1

INVENTOR.
HERBERT E. WHITE
BY
*Eber J. Hyde*
ATTORNEY

March 31, 1959 H. E. WHITE 2,880,021
TELESCOPIC PIPE JOINT WITH TOLERANCE ACCOMMODATING MEANS
Filed March 12, 1954 2 Sheets-Sheet 2

INVENTOR.
HERBERT E. WHITE
BY
ATTORNEY

United States Patent Office 2,880,021
Patented Mar. 31, 1959

2,880,021

TELESCOPIC PIPE JOINT WITH TOLERANCE ACCOMMODATING MEANS

Herbert E. White, Cleveland Heights, Ohio

Application March 12, 1954, Serial No. 415,802

2 Claims. (Cl. 285—328)

This invention pertains to pipe fittings and, more particularly, to fittings for connecting together two lengths of hollow pipe or tubing for structural work such, for example, as structural work with iron pipe, iron or aluminum tubing or with hollow plastic tubing.

At the present time there is considerable demand for a good, neat, easy-to-use and inexpensive fitting for connecting together lengths of standard hollow pipe or tubing so that the pipe or tube can be used for structural work. The many industrial devices which can be made from pipe or tubing, properly secured together, include benches, storage racks, partitions, curtain frames, etc., and for home devices the pipe or tubing may be used for making picnic tables and benches, stands, chairs, etc. In order to achieve its maximum usefulness, the average home owner should be able to make any device out of the fittings and standard pipe using only such tools as he is apt to have about his home.

The fitting of the present invention is extremely simple and is accordingly inexpensive and easy to use; yet by ingenious design it provides a means of making strong, durable and good looking structural work, and for its use it needs only simple tools which are found in the average home.

While the invention achieves its maximum usefulness in use with structural metal pipe, the inventive concept can be carried into the plastic field as plastic fittings can be made for connecting together hollow plastic pipe.

An object of the invention is to provide a fitting for connecting together two or more lengths of hollow pipe which is so simple and easy to use that the average home owner, using only those tools which he usually has at hand, can quickly, easily, and inexpensively construct structural metal or plastic objects.

Another object of the invention is to provide a fitting for connecting together structural pipe to construct devices which show substantially no discontinuity between the fixture and the pipe.

A further object is to provide a fitting for use with hollow pipe, tubing, etc., which makes a tight, non-rotatable joint, but which can be disassembled without loss of very much material.

For a better understanding of the present invention together with other and further objects thereof, reference is had to the following description taken in connection with the accompanying drawings and its scope will be pointed out in the appended claims.

Figure 1:
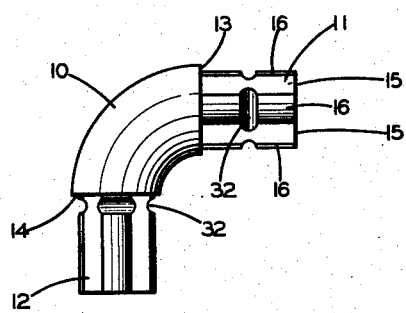
Fig. 1 is a side view of a fitting embodying the invention.

The fitting of the present invention is primarily designed to connect together lengths of standard hollow pipe, such, for example, as standard wall metal water pipe, and/or aluminum, brass, or steel thin-wall tubing or pipe, or plastic conduit. Copper tubing or pipe may also be used, but of course copper is soft and this must be taken into consideration with designing structural devices. The general term "pipe" includes all of the above.

The term "fitting" includes any device for securing together two or more lengths of hollow pipe or tubing, or for terminating a single pipe such for example as a plug for sealing shut an open end of the pipe or tubing. Examples of fittings in addition to the end plug are a straight fitting for splicing together two lengths of pipe with the axes of the pipe aligned, a 90 degree T, T's at angles other than 90 degrees, a Y, L, or 90 degree X, an X at an angle other than 90 degrees, and a corner fitting where three mutually perpendicular pipes are connected together. These fittings are given by way of example; many other types may embody the present invention, and combinations of the various fittings can be formed into unitary bodies. Also, reducing fittings to change from one size of structural pipe to another may embody the invention, and as shown in the drawing a special fitting may be provided for terminating one pipe at right angles into another pipe.

Figure 2:
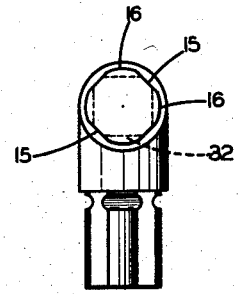
Fig. 2 is an end view of the fitting shown in Fig. 1.
Figure 3:
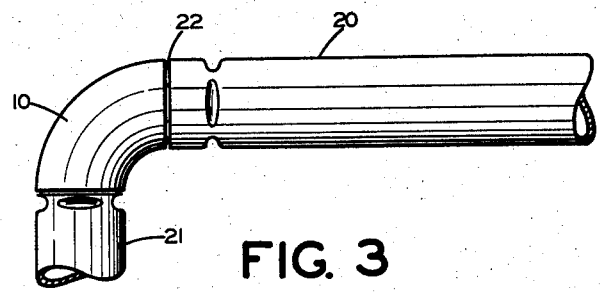
Fig. 3 is a side view showing the fitting of Figs. 1 and 2 in use with a length of hollow pipe.

Figs. 1–3 of the drawing shows by way of example an L-shaped fitting for securing together at 90 degrees two lengths 20, 21 of standard, hollow pipe for structural work. It is comprised of a solid or hollow unitary body formed of metal preferably by a forging or casting operation, or of plastic by a molding operation. The fitting has a main body section 10 of a given diameter and at least two end sections 11 and 12 of a diameter smaller than the given diameter of the body section 10. The reduction in size of the end sections 11 and 12 below the size of the main body section 10 establishes shoulders 13 and 14 between main body section 10 and the end sections 11 and 12.

Figure 7:
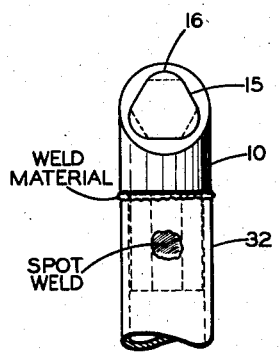
Fig. 7 is an end view, similar to Fig. 2 showing another embodiment of the invention.

The circumference of each of the end sections has alternately flat portions 15 and curved portions 16 as is shown in Fig. 2. It is preferable to have four flat portions and four curved portions around the circumference, and each of the flat and curved portions are preferably approximately the same size. As shown in Fig. 7, the end sections may successfully be made with three straight and three curved portions. A fitting with two flat portions and two curved portions is to be avoided because it will hold a pipe relatively rigid in a plane extending through the curved portions, but will not hold the pipe rigid in any other plane. Fittings having end sections with three or four equally spaced curved portions are preferred as they provide stability of the pipe with respect to the fitting in all directions. More than four flat portions in each end section can be made, but this, however, does not improve on the invention. Also the closer the outside diameter of the end section approaches a circle, the harder it is to fit the pipe closely over the end section. Since it is highly desirable to have a very close, tight fit between the pipe and the fitting, it is advantageous to make the diameter of the curved portions 16 very slightly larger than the internal diameter of the pipe. The pipe can then be driven onto the fitting, or vice versa, and the flat portions 15 of the fitting located between the curved portions accommodates dislocated pipe or fitting material. The presence of the flat portions reduces the importance of maintaining close tolerances in the manufacturing of the fitting, thereby keeping down the cost of the device. Any extra large interference fit can be remedied by filing down one or two of high points on the fitting. If the end section of the fitting were made perfectly round in cross-section, its diameter would have to be kept to close tolerance, and it would become impractical to make it of a size slightly larger than the inside diameter of the pipe because there would be no relieved area, such as the flats 15, to accommodate material dislocated from the pipe or from the fitting. This would make it difficult to drive the pipe onto the fitting and, if the inner diameter of the pipe was too small or the outer diameter of the fitting too large, it would be apt to split the end of the pipe.

The fitting should be inserted into the pipe until the end of the pipe abuts the shoulder 13 or 14 between the larger diameter main body section 10 and the smaller diameter end section 11 or 12. The diameter of the main body section 10 should be equal to the outer diameter of the pipe to which the fitting is adapted to be connected. By thus correlating the diameters of the various parts of the fitting and the pipe, and by providing the flats on the fitting to accommodate displaced material, it becomes possible to bring the shoulder 13 of the fitting 10 and the end of the pipe 20 very close together so that virtually only a hair-line 22 appears between them, and there is formed a smooth, unbroken outer contour line from the pipe to the fitting. A further advantage to having three or four curved sections alternating with three or four flats around the circumference of the end sections is that if the connection between the end section and the pipe is too tight, due to undersize pipe or slightly oversize fitting, the round portions 16 can be filed slightly to bring the end section down to the proper diameter so that it can easily be inserted into the pipe. If the end section were perfectly round, considerable filing would be involved. With the fitting of this invention, only one or two of the rounded areas 16 need to be filed in order to quickly reduce the effective size of the end section.

Several means may be used to hold the pipe to the fitting after the pipe has been slipped over the end section. The pipe and the end section of the fitting within the pipe may be drilled and a taper pin, rivet, or screw used to hold the parts together, as is shown in Fig. 6, wherein the set screw is identified by reference character 30.

Figures 5, 6:
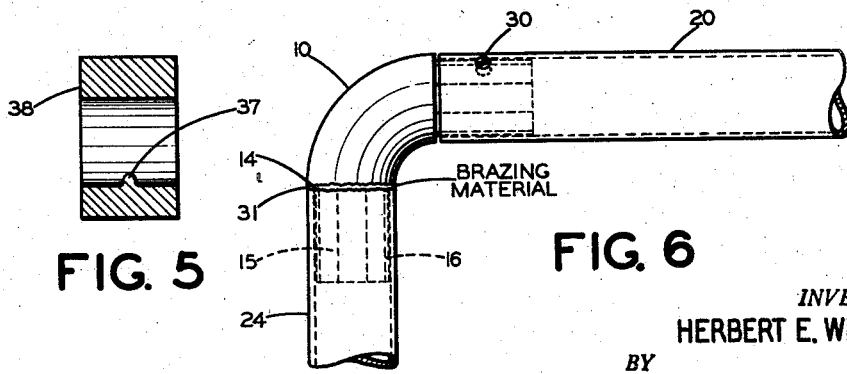
Fig. 5 is a sectional view taken along line 5—5 of Fig. 4.
Fig. 6 is a side view showing two alternative methods of connecting a fitting of this invention to a length of pipe.

Another method, shown in Fig. 6, which can be used is to position between the fitting 10 and the pipe 24 a small amount of brazing material 31, and to then heat the pipe and fitting to cause the brazing material to flow into the joint. The brazing material may be in the form of one or more flat strips of material positioned along the flats 15 of the end sections 11, 12 of the fitting 10 as the pipe 24 is slid on, or it may be in the form of a ring placed around the end section closely adjacent the shoulder 14 or in groove 32. Also, brazing compound in paste form can be applied over the flat or groove areas 15, 32 respectively. The pipe 24 is then slid onto the fitting closely adjacent to the brazing material, and heat is applied. The alternate flat and curved portions of the end sections provide ideal spacing for the fluid brazing material to travel throughout the entire joint area.

Figure 4:
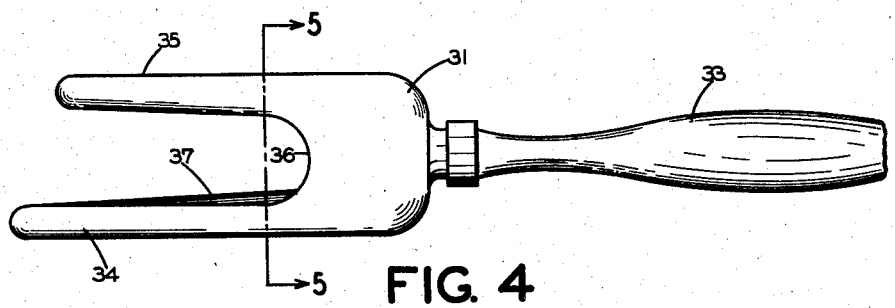
Fig. 4 is a side view of a tool which may be used to connect the pipe to a fitting.

The preferred method of joining the pipe to the fitting is shown in Figs. 1 and 3 and may use a tool 31 such as that shown in Fig. 4, or may use some other means for squeezing the pipe onto the fitting. Also for special applications the use of spot welding or tack welding may be desirable as shown in Fig. 7.

As shown in Figs. 1 and 2, the metal fitting 10 is provided with one or more notches 32 in the curved portions of each of the end sections 11, 12. Preferably the notches 32 are in the form of a groove extending in a direction transverse to the longitudinal axis of the end sections 11, 12, and the bottom of the groove, from end to end, is substantially straight or concave. As shown in Fig. 3, the pipe 20 is slipped over the end section, and it is then squeezed, or otherwise deformed, at the location of the notch 32 to permanently depress the pipe material down into the notch or groove 32 in the end section 11. This prevents the pipe from separating from the fitting due to a longitudinal pull between the two, and with the end of the pipe 20 abutting the shoulder 13 of the fitting a compressional force is readily transmitted between the pipe and the fitting. The bottom of the groove 32 from end to end is substantially flat or concave, and with the pipe material forced well down into the groove rotation of the pipe with respect to the fitting is prevented. As shown in Figs. 1, 2 and 3 the notches 32 may be located near the shoulder 14, or they may be located away from the shoulder 13. Mechanical locking of the pipe to the fitting may be accomplished by using one or more of the notches; however, one is actually sufficient to hold the two parts together.

The tool shown in Figs. 4 and 5 may be used to deform the pipe into the notch 32 in the end sections of the fitting 10. The tool has a handle 33 to which is connected a V-shaped head, one leg 34 of which is slightly longer than the other leg 35. The bottom of the V is rounded, as at 36, and the leg 34 has a ridge 37 extending lengthwise thereof. The tool is positioned around the portion of the pipe 20 which extends over the end section 11 of the fitting 10, with the edge 38 of the tool in alignment with the shoulder 13. The ridge 37 is then aligned with the notch 32 in the end section 11. The operator pushes the tool tightly against the pipe over the notch area and then drives it across the pipe. This deforms the pipe into the notch in the end section of the fitting. Other tools may be used to make this connection. Special pliers or clamp will do it, or a nail may be laid across the pipe above the notch and hit with a hammer.

Figure 8:
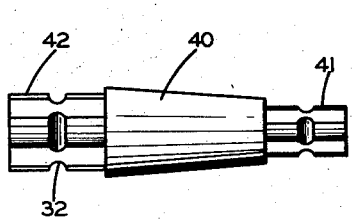
Fig. 8 is a side view of a reducing fitting.

Fig. 8 is a side view of a reducing fitting. The central portion 40 is integral with two end sections 41, 42 of different size. Thus the connector of this invention is applicable to pipes of different size. This saves the builder money because pipes of the smallest size to do the job may be used throughout a structure.

Figure 9:
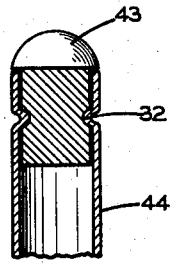
Fig. 9 is a side view of an end cap.

Fig. 9 shows the invention applied to an end cap 43 for closing the open end of a length of hollow pipe 44.

Figure 10:
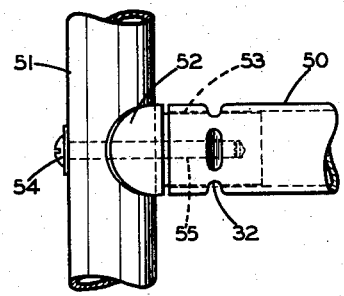
Fig. 10 is a side view showing a fitting for terminating one pipe into a right-angle pipe.

Fig. 10 shows a plastic or metal fitting, for use with plastic or metal pipe, particularly designed to terminate one pipe 50 at 90 degrees into another pipe 51. The fitting has a saddle-shaped member 52 integral with the end section 53. The saddle-shaped member fits snugly around the pipe 51 and pipe 50 is secured to the end section 53 in any of the aforedescribed manners. A screw 54 extends through the pipe 51 into a drilled and tapped hole 55 extending longitudinally into the end section 53. For extra strength the saddle member 52 may be welded to the pipes 51 and 53 if desired. Also, the saddle member may be changed slightly to provide for the pipe 50 to connect to the pipe 51 at an angle other than 90 degrees.

Figure 11:
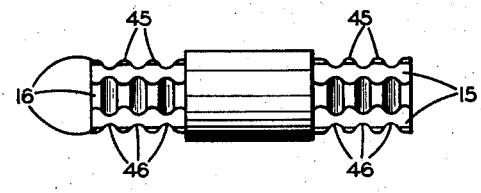
Fig. 11 is a side view of a fitting particularly suited for use with plastic pipe.

Fig. 11 shows a fitting for use with plastic pipes wherein the pipe material cannot take a permanent set upon being squeezed. This fitting is similar to the fitting for metal pipe except that in place of the single notch 32 extending transverse to the axis of the fitting it has a plurality of ridges 45 and valleys 46 extending in a direction transverse to the axis of the end section. This, together with the alternate flat portions 51 and curved portions 16 around the circumference of the end section provide plenty of space to accommodate cement for cementing the plastic pipe to the plastic fitting.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A pipe fitting for connecting together two lengths of hollow pipe for structural work, comprising: a unitary body having a main body section of a given diameter and at least two end sections of diameter smaller than said given diameter defining a shoulder between the main body portion and each of said two end sections, the circumference of each of said end sections having alternately flat and curved portions tangentially joining each other and substantially one-half of the circumference of each of said end sections is comprised of four curved portions and substantially one-half the circumference of each of said end sections is comprised of four curved portions and substantially one-half the circumference is comprised of four straight portions, hollow pipe being adapted to slip over said end section until the end of the hollow pipe substantially engages said shoulder, the diameter of the curved portions of said end section being such that the end section fits tightly into said pipe, and the said given diameter of the main body section being substantially equal to the outer diameter of the said hollow pipe to which it is adapted to be connected forming a smooth, unbroken outer contour line from the pipe to the fitting.

2. A pipe fitting for connecting together two lengths of hollow pipe for structural work, comprising: a solid unitary body having a main body section of a given diameter and at least two end sections of diameter smaller than said given diameter defining a shoulder between the main body portion and each of said two end sections, the circumference of each of said end sections having alternately flat and curved portions tangentially joining each other and substantially one half of the circumference of each of said end sections being comprised of four curved portions and substantially one half the circumference is comprised of four straight portions, at least one of said curved portions in each of said end sections having a notch into which hollow pipe slipped over the end section can be deformed to secure the hollow pipe to the fitting against rotation of the pipe with respect to the fitting and against dislocation of the pipe from the fitting due to an axial pull on the pipe with respect to the fitting, the said given diameter of the main body section being substantially equal to the outer diameter of the pipe to which it is adapted to be connected, and the diameter of the curved portions of each of the end sections being such that each end section fits tightly into said pipe with the end of the pipe abutting against the said shoulder between the main body section and the end section forming a smooth, unbroken outer contour line from the pipe to the fitting.

References Cited in the file of this patent

UNITED STATES PATENTS

| | | |
|---|---|---|
| 557,037 | Toquet | Mar. 24, 1896 |
| 566,855 | Friede | Sept. 1, 1896 |
| 587,695 | Billing et al. | Aug. 10, 1897 |
| 1,291,388 | Bright et al. | Jan. 14, 1919 |
| 1,475,257 | Bottone | Nov. 27, 1923 |
| 1,678,640 | Hall | July 31, 1928 |
| 1,797,691 | Merrill | Mar. 24, 1931 |
| 2,375,574 | Metheny et al. | May 8, 1945 |
| 2,465,083 | Gradisar | Mar. 22, 1949 |
| 2,584,283 | Oliver et al. | Feb. 5, 1952 |

FOREIGN PATENTS

| | | |
|---|---|---|
| 518,018 | France | Dec. 24, 1920 |
| 231,231 | Great Britain | Mar. 23, 1925 |
| 52,887 | Denmark | Mar. 15, 1937 |